United States Patent
D'Acquisto (10) Patent No.: US 12,063,925 B2
(45) Date of Patent: Aug. 20, 2024

(54) TREESTAND AND CLIMBING STICK DESIGN

(71) Applicant: Andrae D'Acquisto, Bellevue, IA (US)

(72) Inventor: Andrae D'Acquisto, Bellevue, IA (US)

(\*) Notice: Subject to any disclaimer, the term of this patent is extended or adjusted under 35 U.S.C. 154(b) by 858 days.

(21) Appl. No.: 16/602,957

(22) Filed: Jan. 4, 2020

(65) Prior Publication Data

US 2020/0253190 A1    Aug. 13, 2020

Related U.S. Application Data (60) Provisional application No. 62/918,101, filed on Jan. 10, 2019.

(51) Int. Cl.
*A01M 31/02* (2006.01)
*A63B 27/00* (2006.01)

(52) U.S. Cl.
CPC ............. *A01M 31/02* (2013.01); *A63B 27/00* (2013.01)

(58) Field of Classification Search
CPC ................................ A01M 31/02; A63B 27/00
See application file for complete search history.

(56) References Cited

U.S. PATENT DOCUMENTS

| | | | | |
|---|---|---|---|---|
| 3,885,649 A | * | 5/1975 | Damron | A01M 31/02 182/187 |
| 3,949,835 A | * | 4/1976 | Butler | A01M 31/02 248/230.8 |
| 4,113,057 A | * | 9/1978 | Bessinger | A01M 31/02 108/2 |
| 4,120,379 A | * | 10/1978 | Carter | A01M 31/02 182/187 |
| 4,124,094 A | * | 11/1978 | Cande | A01M 31/02 182/20 |
| 4,148,376 A | * | 4/1979 | Campbell, Jr. | A45F 3/04 182/20 |
| 4,582,165 A | * | 4/1986 | Latini | A01M 31/02 182/20 |
| 4,720,029 A | * | 1/1988 | Varanakis | A47C 4/52 224/155 |
| 4,727,961 A | * | 3/1988 | Dawson | A01M 31/02 182/187 |
| 4,776,503 A | * | 10/1988 | Sink | A01M 31/025 182/187 |
| 4,836,938 A | * | 6/1989 | Kobasic | A01M 31/02 224/155 |
| 4,989,766 A | * | 2/1991 | Lewallyn | A01M 31/02 182/187 |
| 5,060,756 A | * | 10/1991 | D'Acquisto | A01M 31/025 182/187 |
| 5,105,910 A | * | 4/1992 | Engstrom | A01M 31/02 224/155 |
| 5,265,780 A | * | 11/1993 | Matthews | A45F 4/02 182/187 |

(Continued)

*Primary Examiner* — Jessica L Laux
*Assistant Examiner* — Kathleen M. McFarland (57) ABSTRACT

The present invention generally relates portable treestand for hunters which comprises a platform and a seat member wherein when the treestand if folded up for easy transport the seat interlocks to the treestand platform creating a shelf useful for carrying gear, backpacks, game, etc. In one embodiment, the platform and/or seat are each of one-piece construction fabricated from a solid aluminum/aluminum alloy workpiece, optionally by a waterjet process.

6 Claims, 11 Drawing Sheets

(56) References Cited

U.S. PATENT DOCUMENTS

| | | | | |
|---|---|---|---|---|
| 5,462,135 | A * | 10/1995 | Ambler | A01M 31/02 182/187 |
| 5,695,099 | A * | 12/1997 | Strum | A45F 4/02 224/155 |
| 5,839,783 | A * | 11/1998 | Black | A01M 31/02 297/380 |
| 5,975,389 | A * | 11/1999 | Braun | A45F 4/02 224/916 |
| 6,085,868 | A * | 7/2000 | Anthony | A01M 31/02 182/187 |
| 6,170,609 | B1 * | 1/2001 | Dech | E06C 1/381 182/189 |
| 6,464,118 | B2 * | 10/2002 | McUmber | A45F 4/02 224/155 |
| 6,520,291 | B2 * | 2/2003 | Andrey | A01M 31/02 182/195 |
| 6,547,035 | B1 * | 4/2003 | D'Acquisto | E06C 1/34 182/100 |
| 6,662,981 | B2 * | 12/2003 | McUmber | A45F 3/10 224/155 |
| 6,722,472 | B2 * | 4/2004 | Berkbuegler | A01M 31/02 182/135 |
| 7,163,082 | B2 | 1/2007 | Bigard | |
| 8,556,035 | B1 * | 10/2013 | Kendall | E06C 1/381 182/189 |
| 8,631,906 | B2 * | 1/2014 | Phillips | A01M 31/02 182/136 |
| 8,991,555 | B2 * | 3/2015 | Furseth | E06C 7/48 182/187 |
| 8,997,933 | B2 * | 4/2015 | Furseth | A01M 31/02 264/630 |
| 9,027,709 | B2 * | 5/2015 | Wheelington | A01M 31/02 182/129 |
| 9,137,982 | B2 * | 9/2015 | Yoder | A01M 31/02 |
| 9,732,556 | B2 | 8/2017 | Priest | |
| 10,301,873 | B2 | 5/2019 | Priest et al. | |
| 10,582,704 | B2 * | 3/2020 | Wheelington | A01M 31/02 |
| 10,653,129 | B2 * | 5/2020 | Check | A01M 31/02 |
| 10,798,937 | B2 * | 10/2020 | Berry | A01M 31/02 |
| 10,973,224 | B2 * | 4/2021 | Infalt | A01M 31/02 |
| D943,117 | S * | 2/2022 | D'Acquisto | D25/69 |
| 11,330,813 | B2 * | 5/2022 | Power | F16M 13/02 |
| 11,602,213 | B1 * | 3/2023 | Leach | F16M 13/022 |
| 2001/0023794 | A1 * | 9/2001 | Andrey | E06C 1/125 182/116 |
| 2002/0100778 | A1 * | 8/2002 | McUmber | A45F 4/02 224/155 |
| 2003/0000974 | A1 * | 1/2003 | McUmber | A45F 3/10 224/628 |
| 2003/0192741 | A1 * | 10/2003 | Berkbuegler | A01M 31/02 182/187 |
| 2005/0230186 | A1 | 10/2005 | Bigard | |
| 2008/0073151 | A1 * | 3/2008 | Boepple | A01M 31/02 182/187 |
| 2008/0128204 | A1 * | 6/2008 | Engstrom | A01M 31/02 182/187 |
| 2010/0126803 | A1 * | 5/2010 | Cama | A01M 31/02 182/187 |
| 2011/0180351 | A1 * | 7/2011 | Cama | A01M 31/02 182/222 |
| 2012/0080267 | A1 * | 4/2012 | Furseth | E06C 7/48 182/115 |
| 2012/0080269 | A1 * | 4/2012 | Furseth | A01M 31/02 164/113 |
| 2012/0181110 | A1 * | 7/2012 | Browning | A01M 31/02 182/115 |
| 2015/0181860 | A1 * | 7/2015 | Johnson | A01M 31/02 182/187 |
| 2016/0265276 | A1 * | 9/2016 | Hartman | E06C 7/48 |
| 2018/0192634 | A1 * | 7/2018 | Check | A01M 31/02 |
| 2019/0053483 | A1 * | 2/2019 | Infalt | A01M 31/02 |
| 2019/0055782 | A1 * | 2/2019 | Infalt | B23P 13/02 |
| 2020/0253190 | A1 * | 8/2020 | D'Acquisto | A01M 31/02 |
| 2021/0084889 | A1 * | 3/2021 | Berry | A01M 31/02 |
| 2021/0205667 | A1 * | 7/2021 | Garis | E06C 1/34 |
| 2021/0227819 | A1 * | 7/2021 | Infalt | B23P 13/02 |
| 2021/0329908 | A1 * | 10/2021 | Corl | A01M 31/02 |
| 2021/0386181 | A1 * | 12/2021 | Farmer, II | A45F 3/08 |

* cited by examiner

TREESTAND AND CLIMBING STICK DESIGN

The present application claims benefit of U.S. provisional application Ser. No. 62/918,101 filed Jan. 10, 2019.

FIELD OF THE INVENTION

The present invention generally relates portable treestand for hunters which comprises a platform and a seat member wherein when the treestand if folded up for easy transport the seat interlocks to the treestand platform creating a shelf useful for carrying gear, backpacks, game, etc. In one embodiment, the platform and/or seat are each of one-piece construction fabricated from a solid aluminum/aluminum alloy workpiece, optionally by a waterjet process.

The invention also contemplates improved climbing sticks, also referred to as ladder modules, for use in climbing trees for hunting or other purposes. The module includes one or more support brackets mounted to the support member. The brackets are generally V-shaped and include a number of teeth on the interior surface of the bracket that engage the tree on which the module is placed to prevent the module from slipping on the tree. These brackets that grip the tree when climbing pivot allowing them to become flush with the body of the stick to minimize profile and to allow the sticks to nest closely together so that they can be easily carried/secured to the treestand of the invention.

The invention also contemplates the treestand of the invention coupled to the climbing sticks of the invention.

BACKGROUND OF THE INVENTION

The present invention pertains to a portable treestand for hunting or the like and, in particular, to a treestand in which the main supporting platform is constructed of a one-piece lightweight metal construction.

Portable treestands for hunting, which are demountably attachable to the trunk of a tree to provide an improved vantage point, have been used for many years. Such treestands are available in an extremely wide variety of types, providing a myriad of sizes, shapes, materials of construction, mounting mechanisms and other features. Key among the important features to be considered by a hunter in choosing a treestand are safety, weight, simplicity of construction and use, and camouflage or capability of masking the construction from hunted game. The considerations of safety and weight are often conflicting because adequate strength frequently requires the use of heavier and stronger structural members. Lightweight structural materials are, therefore, used almost exclusively in the construction of treestands. To balance the considerations of strength, weight and cost, structural aluminum has been the material of choice. As a result, the majority of treestands on the market today utilize some type of tubular aluminum supporting structure for the main supporting platform of the treestand. The tubular aluminum supporting structure may include cross members which are closely enough spaced to provide the platform on which the hunter may stand directly. More often, however, the structural aluminum framework generally defines the outer perimeter of the platform and includes a few intermediate cross members. The supporting framework is covered with a thin rigid layer of floor material of any of several types, including sheets of wood or plastic and expanded metal grids.

In each of the prior art treestand platforms broadly included in the various types described above, the platform is fabricated from a plurality of components using a variety of fastening techniques, including welding, rivets, screws and bolts. Even in those treestand platform constructions in which the structural aluminum members are closely spaced so that a separate floor covering is not required, a large amount of welding is required in the fabrication process. Where a floor cover or plate is also required, additional welding or the use of other types of fasteners must be undertaken.

The use of mechanical fasteners in the fabrication of a platform creates joints which inherently are not completely rigid and as a result may move and squeak or create other noises. Skilled hunters are extremely sensitive to any equipment that is unnecessarily noisy. Fasteners and fastener joints also present the potential for catching clothing or the like which is both annoying and potentially dangerous. Finally, all prior art fabricated treestand platforms are characterized by some sort of regular geometric pattern in either or both the supporting structure and the floor layer or covering. Skilled hunters are also aware that ordered structural patterns are generally an anomaly in the wild and, when seen by hunted animals, may keep them from approaching or cause them to flee.

Treestands comprising a one-piece cast aluminum platform represent an improvement in the art, but they are expensive to fabricate and providing a uniform aluminum case can be difficult to produce.

Thus, despite the extremely wide variety of treestand platforms disclosed in the prior art and on the market today, all are subject to the same problems and deficiencies in construction, operation and use described above. It would be most desirable, therefore, to have a treestand including a platform which is of simple construction, does not require welded or cast fabrication or the use of fasteners, and yet is strong and light weight. In addition, the platform should be readily adaptable for use in both climbing and non-climbing stand constructions. It would also be desirable to have a treestand platform which does not present a noticeable geometric pattern to approaching game.

SUMMARY OF THE INVENTION

The present invention generally relates to a portable treestand for hunters which comprises a platform and a seat member wherein when the treestand is folded up for easy transport the seat interlocks to the treestand platform creating a shelf useful for carrying gear, backpacks, game, etc. In one embodiment, the platform and/or seat are each of one-piece construction fabricated from a solid aluminum/aluminum alloy workpiece, optionally by a waterjet process. In another embodiment, the treestand of the invention comprises a one-piece, rigid platform having an open grate-like construction and optionally a one-piece solid support structure or post, optionally having an irregular cutout design. The rigid one-piece platform and/or center support post of the present invention characterized by a plurality of irregularly shaped openings or cutouts, which vary in size, shape and orientation, when viewed in horizontal section through the platform, in directions extending radially and tangentially to the trunk of the tree on which the treestand is mounted.

In another embodiment, the platform and/or the center support post is fabricated from a single aluminum workpiece, optionally by abrasive waterjet process. The waterjet process allows for the fabrication of a one-piece treestand platform and/or solid center support post that are stronger, lighter and cheaper to make than cast aluminum platforms and/or hollow tubular center support structures. The unitary construction of the platform eliminates a large number of fabrication steps and the related fastening techniques and devices used therewith. As a result, the platform is stronger, lighter and more rigid, free of many potentially movable joints, and may be made with an irregular pattern.

The invention also contemplates improved climbing sticks, also referred to as ladder modules, for use in climbing trees for hunting or other purposes. The module includes a support member having a pair of support brackets mounted at the top and bottom ends of the support member. The brackets are generally V-shaped and include a number of teeth on the interior surface of the bracket that engage the tree on which the module is placed to prevent the module from slipping on the tree. These brackets that grip the tree when climbing pivot 180°, in another embodiment 360° allowing them to become flush with the body of the stick to minimize profile and to allow the sticks to nest closely together so that they can be easily carries/secured to the treestand of the invention.

DETAILED DESCRIPTION OF THE INVENTION

The present invention relates to a treestand characterized by a hang-on seat that locks into the foot platform via locking ports creating a rigid shelf structure capable of packing out game and or gear upwards of 100 lbs. More specifically, the treestand of the invention comprises a seat member, a platform member and a center support structure connecting said seat member to said platform member. The seat member comprises one or more male protrusions and the platform comprises one or more female attachment ports configured to receive said male protrustions thereby locking the seat into a shelf like structure. When packing up the stand for transport, the shelf created by the seat is ideal for transporting gear, meat, clothes, skull & cape etc. Essentially the treestand doubles as an effective way to transport gear and could even take the place of a frame style pack if desired. This feature of the invention is applicable to all treestand designs and is not limited to the preferred embodiments of this invention. The locking or attachment ports that are fabricated into the platform can be enhanced and or replaced by brackets, clamps, locking pins, braces or any other fastening means that effectively locks the seat to the platform creating a shelf-like structure. This feature is applicable to all types of treestand designs and is not limited to the preferred embodiments described herein.

In another embodiment, the portable treestand comprising a one-piece, rigid platform and/or a solid center support structure as opposed to a hollow tubular center support structure prevalent in the prior art. This solid center support is optionally characterized by a series of cutouts, in another embodiment irregular cutouts that reduce weight and provide a camouflage attribute to the treestand. The solid center support structure of the invention is far less noisy and much stealthier than the hollow tubular support structures of the prior art.

In another embodiment, the treestand of the invention also comprises a platform that comprises integrated attachment points for quiet and secure transporting of climbing sticks, resulting the smallest profile transport of any hang-on climbing stick combo.

In yet another embodiment the teeth on the foot casting of the platform are drafted toward the tree allowing the stand to settle down when weight is applied without any additional movements. In one embodiment the teeth are angled, generally at least 5° below the horizontal plane of the platform, in another embodiment at least 10° below the horizontal plane of the platform, in another embodiment at least 15° below the horizontal plane of the platform, and in yet another embodiment from 20-35° below the horizontal plane of the platform.

In its broadest embodiment, the treestand of the invention can be made of by any process, including machining from a solid metal workpiece, including aluminum and the like, and/or by a cast aluminum process, waterjet process, laser cutting, plasma cutting and the like. Any form of aluminum, aluminum alloy, or other metal/metal alloy can be used to fabricate the treestands of the invention provided that they are sufficient strength and not excessively heavy.

One-piece cast aluminum platforms are the benchmark for a one-piece lightweight treestand platform. However today, there is high demand for even lighter weight treestands. The strongest currently available material practically employed in fabricating cast treestand platforms is 356t6 aluminum. Such castings have reached their plausible limit due to size and weight to strength ratio.

The other option to obtain a lighter treestand platform is to use a non-casted platform and/or seat and/or solid support structure machined from one-piece plate stock. This machining process allows one fabricate platforms that are much lighter and stronger than cast platforms, but at a significantly greater cost.

In one embodiment, the platform of the invention is fabricated from a single aluminum workpiece by a waterjet process, optionally an abrasive waterjet process. Optionally, the treestand seat is also fabricated from a single aluminum workpiece by a waterjet process, in one embodiment an abrasive waterjet process. Finally, the solid center support structure is also fabricated from a single aluminum workpiece by a waterjet process, preferably a waterjet process. Fabricating one-piece platforms with an abrasive water jet process allows one to make platforms that are even stronger and lighter than platforms machine from one piece of plate stock. Utilizing a waterjet process allows one to reduce the wall thicknesses of the platform and still achieve the strength needed. Accordingly, the one-piece platforms of the invention made by waterjet process are among the strongest and lightest platforms in the industry. The waterjet process allows for the fabrication of a one-piece treestand platform that is stronger, lighter and cheaper to make than cast aluminum platforms. Similar benefits are realized by fabricating the treestand seat and solid center support structure by a waterjet process, in one embodiment an abrasive waterjet process.

Water jet cutting uses an ultra-high-pressure stream of water to carry an abrasive grit. The abrasive does the cutting through a mechanical sawing action, leaving a smooth, precision cut surface. Waterjet is the most versatile process, because it is able to cut almost any type of material, including aluminum. Water jet is a very precise cutting process. It has a narrow kerf width, allowing fine contours to be cut, and producing high tolerance parts. The effect is to produce the parts you need for substantially lower cost, in substantially less time.

The water jet cutting process starts with an intensifier pump, which creates the ultra-high pressure (up to 90,000 psi) water pressure required for cutting hard materials. The Intensifier pump uses a hydraulic pressure over water system. A large horsepower motor drives a hydraulic pump, creating hydraulic pressure which powers a piston in a cylinder. The pressurized water is delivered to a cutting head by either high pressure tubing or hose. At the cutting head, the high pressure water is applied to an orifice with a typical diameter ranging from 0.005" to 0.020". This orifice is made in a diamond or sapphire, to resist abrasion of the high-pressure water. The orifice defines and creates the water stream which cuts through the material.

After the water stream exits the orifice, an abrasive can be added to the water stream, to allow it to cut hard materials. When cutting hard materials, including steel, stainless steel, aluminum, stone, wood, plastic, glass, etc., it is the abrasive that does the actual cutting using a mechanical sawing type action. The abrasive is usually crushed garnet, the same type of material often used as the abrasive on sand paper. Some special applications utilize other abrasive types.

Figure 1:
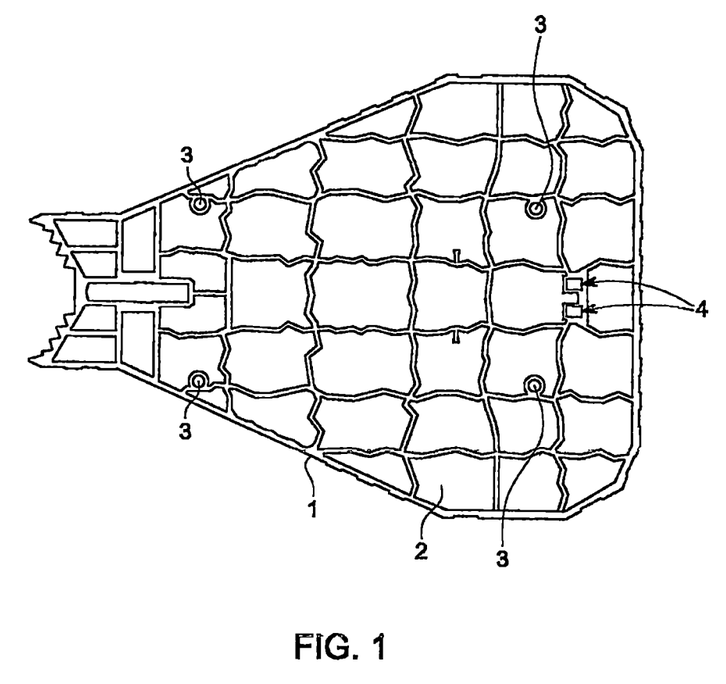
FIG. 1 is a top plan view of the main supporting platform of the treestand, utilizing the unique one-piece construction and showing the open grate-like configuration.

FIG. 1 shows one embodiment of the treestand of the invention which comprises a supporting platform 1 of uniform, one-piece rigid construction. In one embodiment, the platform is fabricated from one-piece aluminum stock by an abrasive waterjet process. The platform may be used in a wide variety of treestand constructions. The treestand platform 1 shown in FIG. 1 is a non-climbing type, but the platform 1 is adaptable for use in so called "climbing" treestands which may be moved, by the action of the hunter standing or sitting thereon, upwardly along the trunk of a tree to a final desired position.

Referring to FIG. 1, the platform 1 of the present invention comprises an open grate-like pattern 2 which is characterized by a plurality of irregularly shaped openings which vary substantially in size, shape and orientation in the horizontal plane of the platform 1. The variations in the openings are in directions both radially from the center of the tree and tangentially to the tree trunk. The platform of the invention also comprises carrying ports 3 that are configured to receive and attach specially designed climbing sticks that comprise grommets or other fixtures that are configured to fit into said carrying ports. Additionally, the platform 1 comprises locking ports 4 for locking the seat element 7 into a shelf position. The locking port assembly can also comprise locking pins or other fasteners to secure the seat in the self-position.

Figure 2:
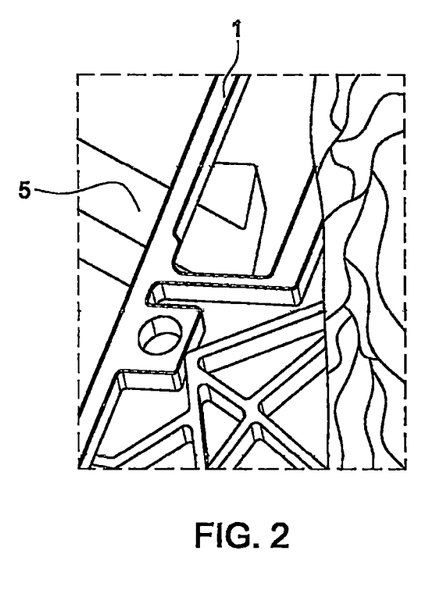
FIG. 2 shows the carrying strap slots fabricated in the platform of the invention.

FIG. 2 describes another embodiment of the invention wherein platform 1 of the invention additionally comprises carrying strap attachment slots 5 that eliminate the need for plastic clips and ladder locks.

Figure 3:
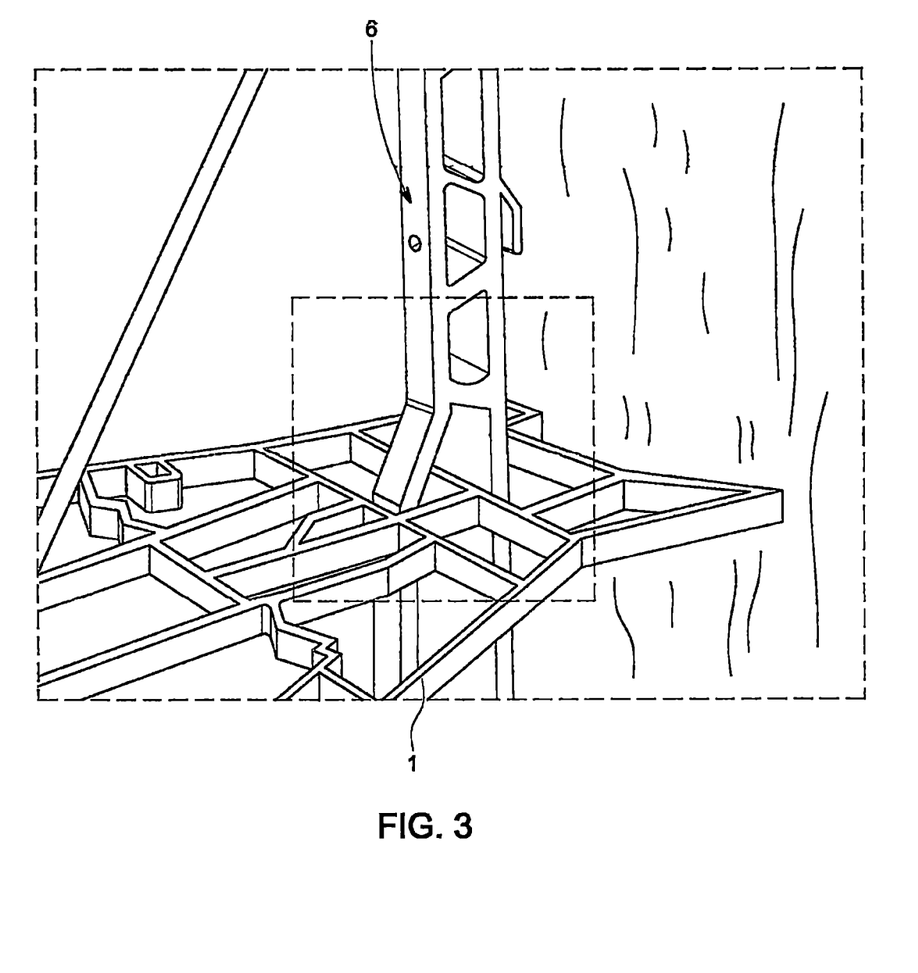
FIG. 3 shows the attachment of the center post to the platform of the invention.

As shown in FIG. 3, the platform 1 of the treestand is attached adjacent to its inner edge directly to a solid rigid center support structure or post 6 without the use of a hinge. The center support is attached below the horizontal plane of the platform 1 allowing one to eliminate added components to attach the center post necessary in many prior art treestands.

Figure 4:
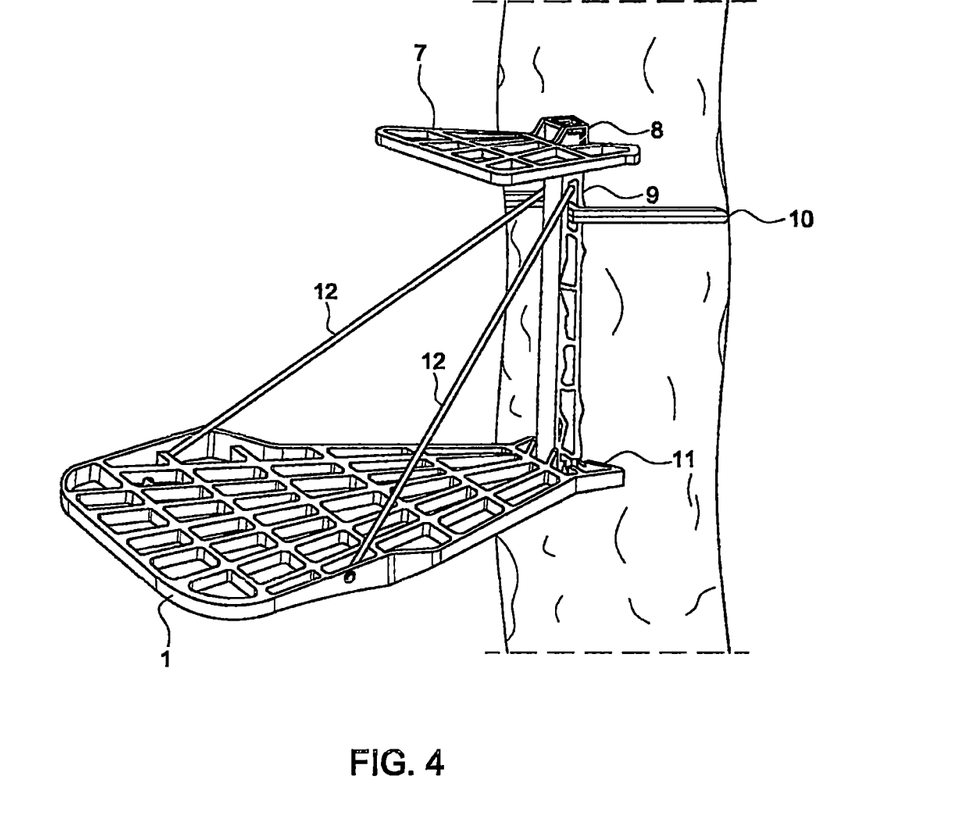
FIG. 4 is a perspective view of a treestand of the present invention shown mounted on the trunk of a tree.

FIG. 4 shows a seat 7 is attached by upper hinged connection 8 to the upper end of the center post 9. The seat 7 may be constructed similarly to the platform 1, but of a substantially smaller size, and one embodiment also comprises waterjet aluminum. The primary mounting attachment for the treestand comprises a rope or strap 10 attached at one end to the center post 6 and extending around the tree trunk to a similar attachment at its other end. Alternatively, the center support post can comprise a fastener or versa butting type attachment means for receiving a rope or strap, optionally having looped ends. The inner edge of the seat 7 includes a V-shaped notch 11 which is provided with tree engaging teeth on the foot casting of the platform 11 drafted toward the tree allowing the stand to settle down when weight is applied without any additional movements. In one embodiment the teeth are angled, generally at least 5° below the horizontal plane of the platform, in another embodiment at least 10° below the horizontal plane of the platform, in another embodiment at least 15° below the horizontal plane of the platform, and in yet another embodiment from 20-35° below the horizontal plane of the platform.

The seat 7 and platform 1 are configured such that downward pivotal movement of the seat and/or platform from an initial vertical position against the tree trunk, causes the center post 6 to move outwardly from the tree trunk, puts the rope 10 in tension, and causes the teeth in the V-shaped notch 11 to bite into the tree. The main supporting platform 1 is maintained in a generally horizontal position with a pair of supporting cables 12 each of which is connected by its upper end to the center post just below the seat 7 and by its lower end to the lateral edge of the platform at a point outwardly from the tree trunk. The inner edge of the platform is provided with a large V-shaped notch 11 which is also provided with teeth on its tree-engaging face to help hold the treestand securely in position once the rope connection 10 has been securely locked around the tree trunk.

Figure 5:
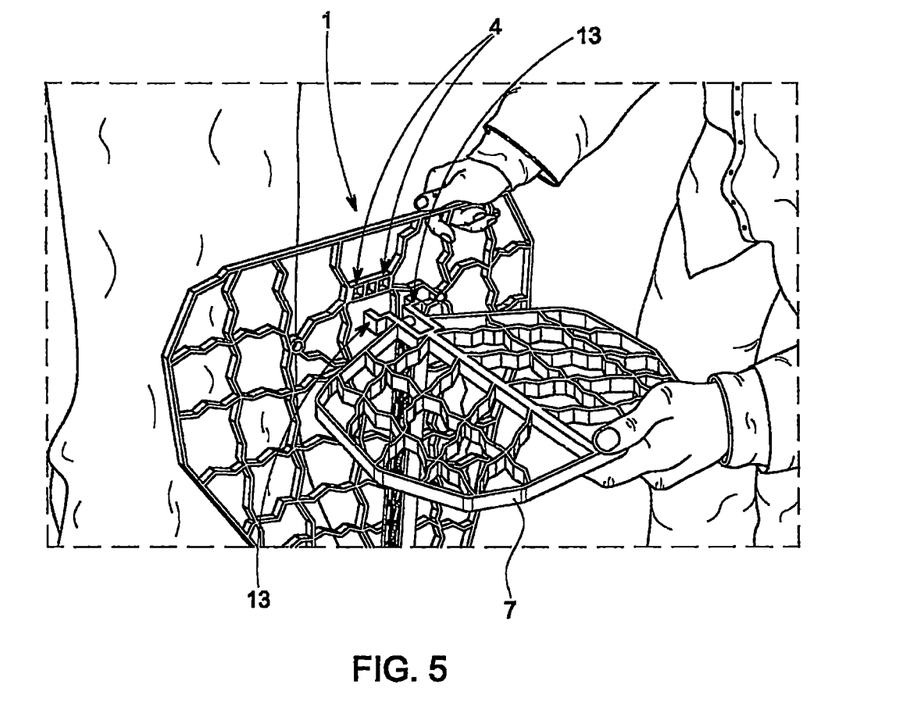
FIG. 5 is a perspective view of the seat locked into the foot platform of the invention.

FIG. 5 shows the treestand platform 1 of the invention comprising a hang on seat 7 comprising male protrusions 13 that lock into foot platform 1 via locking ports 4 creating a rigid shelf structure capable of packing out game and or gear upwards of 100 lbs. More specifically, when packing up the stand for transport, the rear of the seat casting interlocks to the platform 1 via locking ports 4 creating a shelf for transporting gear, meat, clothes, skull & cape etc. Essentially your stand doubles as an effective way to transport gear and could even take the place of a frame style pack if desired.

Figure 6:
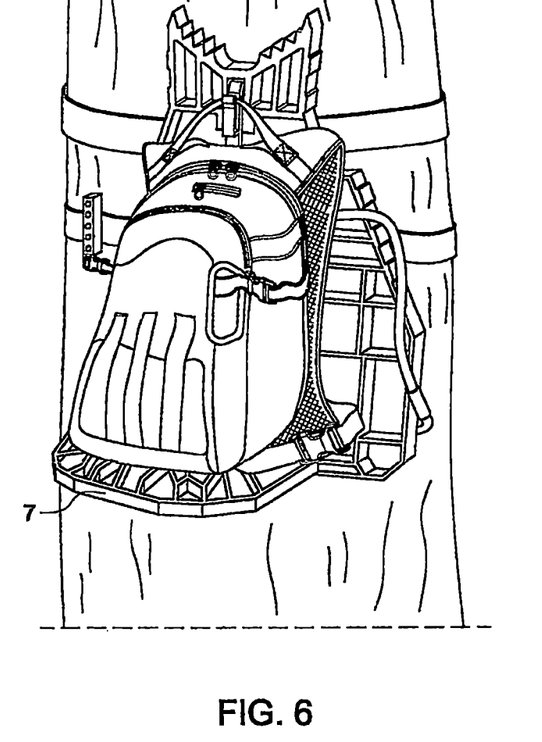
FIG. 6 is a view of the seat of the treestand locked into place creating a shelf for carrying gear.

FIG. 6 shows seat 7 locked into place creating a shelf for carrying a backpack or other gear.

Figure 12:
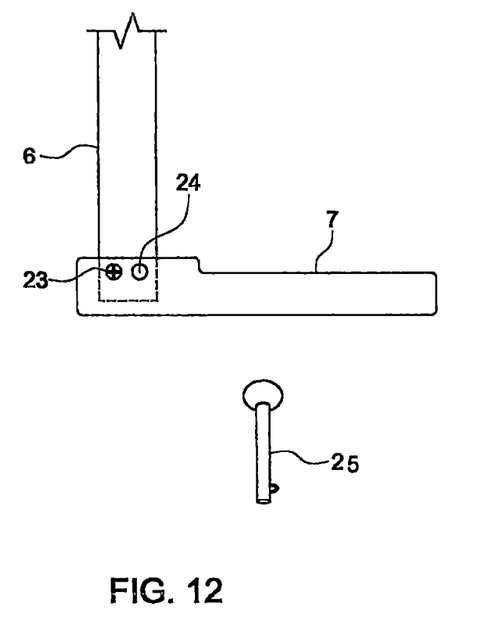
FIG. 12 shown an alternative embodiment for affixing the treestand seat in the shelf position.

FIG. 12 shows an alternative embodiment of locking the seat 7 of the treestand in a shelf like position. In this embodiment, the seat 7 is locked to the center support structure 6 in the shelf position via a clevis pin 25, locking pin, cotter pin, bolt or other fasteners. More specifically, in this embodiment the seat is attached to the center support structure via bolt 23. An additional hole 24 is drilled through the seat and the center support structure such that when the holes are aligned and a clevis pin, locking pin or the like is inserted through the aligned holes the seat is fixed in the shelf position. This embodiment eliminates the need for locking ports 4 in the platform and/or male protrusions 13 in the rear of the seat.

In a further embodiment, the treestand of the invention comprises both methods for locking the seat in the shelf position, i.e., the seat 7 comprises male protrusions 13 that lock into foot platform 1 via locking ports 4 and the seat is locked into place by virtue of locking pins as demonstrated in FIG. 12, creating a rigid and ultra-secure shelf structure. wherein said seat is locked into the shelf position by using capable of packing out game and or gear upwards of 100 lbs.

The strength increase provided by a solid unitary aluminum construction by waterjet process allows the size of the interior members to be reduced, as well as their spacing. The solid construction also reduces the transmission of noise more common in constructions utilizing hollow tubular structural members. Similar benefits are realized by fabricating the treestand seat and/or the solid center support post by a waterjet process.

Finally, the entire outer surface of the platform, seat and/or center support structure may be anodized with an irregular contrasting pattern to further enhance its camouflage appearance.

Climbing Stick Embodiment

The invention also contemplates improved climbing sticks, also referred to as ladder modules, for use in climbing trees for hunting or other purposes. The module includes a support member having a pair of support brackets mounted at the top and bottom ends of the support member. The brackets are generally V-shaped and include a number of teeth on the interior surface of the bracket that engage the tree on which the module is placed to prevent the module from slipping on the tree. These brackets that grip the tree when climbing pivot allowing them to become flush with the body of the stick to minimize profile and to allow the sticks to nest closely together so that they can be easily carries/secured to the treestand of the invention. This feature of the invention is applicable to any climbing stick design and is not limited to the preferred embodiments described herein.

The module also includes a releasable securing arrangement for securing the module about the tree. The arrangement comprises a belt having a buckle and a pair of straps removably engagable with a fastener mounted to the support member on the side of the support member opposite the support brackets. The configuration of the securing arrangement allows the belt to be selectively and releasably positioned on the support member to avoid any interference with the belt by limbs or branches extending from the tree. The module also comprises a number of steps rotatably mounted to the support member at the top, center, and bottom of the support member opposite the support brackets. Each step includes a pair of annular shoulders on either side of the step that are engagable with a stop that is directly fabricated into the support member, allowing the step to provide a stable, horizontal stepping surface when rotated to either side of the support member.

Each climbing stick is equipped with plug style grommets and receiving ports configured to receive said grommets, which allow one to securely attach two or more sticks to each other snugly for transport. These plugs also fit into carrying ports 3 located at pre-determined locations on the treestand platform 1.

The support member of the sticks optionally comprise hand grips cut right into the support member allowing for better grip when climbing. In one embodiment, the support member is not straight it jogs for added concealment and profile break up when in tree. Patterns and true edges are very unnatural in nature. The cutout designs cut out of support member of the sticks of the invention have no consecutive pattern to better blend in the wilderness.

The rope or strap for attachment to the tree comes through the stick from back to front allowing you the option of going around the tree in either direction opposed to the rope coming out of one side. Optionally, the rope attachment anchor can be built into upright section of stick for streamline attachment, or traditional attachment means can be used. The attachment anchor serves as a wedge for rope attachment opposed to dual cam mechanisms.

In its broadest embodiment, the solid center support structure of the ladder module of the invention can be made of by any process, including machining from a solid metal workpiece, including aluminum and the like, and/or by a cast aluminum process. Any form of aluminum, aluminum alloy, or other metal/metal alloy can be used to fabricate the treestands of the invention provided that they are sufficient strength and not excessively heavy.

One option to obtain a lighter ladder module is to use a non-casted, support structure machined from one-piece plate stock. This machining process solid allows one to fabricate solid center support structures from a single piece of aluminum stock that are much lighter and stronger than cast platforms, but at a significantly greater cost.

In one preferred embodiment of the invention the center support structure of the module of the invention is fabricated from a single aluminum workpiece by a waterjet process, optionally an abrasive waterjet process. Fabricating a solid one-piece center support structure with an abrasive water jet process allows one to make support structures that are even stronger and lighter than structures machined from one piece of plate stock. Utilizing a waterjet process allows one to reduce the wall thicknesses and still achieve the strength needed. Accordingly, the support structures of the present ladder modules of the invention made by waterjet process are among the strongest and lightest in the industry. Additionally, they are quieter and stealthier than prior art support structures that are generally of hollow tubular design.

The individual modules, or climbing sticks, used in forming these ladders have a simple construction comprised of a number of individual alternating steps secured to an elongate solid support structure. The individual steps are either mounted in the stationary position or they can be pivotably mounted to the support member, allowing the steps to rotate from a closed, vertical position when the module is in transport or is not in use, to an open, horizontal position where the step points outward perpendicular to the support member to provide alternating stepping surfaces for the individual utilizing the module ladder.

Each module is secured to the tree trunk by a securing belt attached at one end by a bolt to one side of the support member. The belt is releasably secured at its opposite end to a belt hook or fastener attached to the center support member opposite the belt.

The module is supported on the tree by a pair of stabilizing brackets located at the upper and lower ends of the support member. The brackets engage the trunk of the tree to prevent the ladder module from sliding downwardly along the trunk while supporting an individual. The brackets are rotatably mounted to each end of the support member to allow each bracket to independently conform to the direction in which the tree trunk extends. The brackets that grip the tree when climbing pivot allowing them to become flush with the body of the stick to minimize profile and to allow the sticks to nest closely together so that they can be easily carried/secured to the treestand of the invention. In one embodiment, the brackets pivot 180° to allow them to rest flush with the body or support member of the stick. In another embodiment, the brackets pivot 360° to allow them to rest flush with the body or support member of the stick. This feature of the invention is applicable to any conventional climbing stick design and is not limited to the preferred embodiments described herein. For example, the invention contemplates and includes conventional climbing sticks of hollow tube design, or any other design, having stabilizing brackets that pivot allowing them to become flush with the body of the stick to minimize profile and to allow the sticks to nest closely together.

The improved ladder module/climbing stick is specially adapted to form a modular ladder for climbing a tree to position and/or reach a tree stand. The module comprises a set of steps which can be stationary or rotatably connected to an elongate, solid center support structurer. The steps have an arrowhead-like shape and are spaced from each other along the length of the support member to form an upper step, a middle step, and a lower step. The steps are rotatably mounted on a support member and are capable of rotating in either direction with respect to the support member to provide a grooved, non-slip stepping surface on either side of the support member.

Each step includes a grooved stepping surface disposed on both long sides of each step that allow the steps to provide a non-slip stepping surface when rotated to either side of the support member. Also, on both sides of the point of attachment of each step to the support member are located a pair of annular shoulders, capable of restricting the rotation of each step with respect to the support member. Each shoulder engages a stop located beneath the step to selectively position the step outwardly on either side of the support member. In one embodiment, the stops are fabricated directly into the solid, one-piece center support structure. This improved step/stop construction allows the ladder module of the present invention minimizes parts that ordinarily would need to be installed/fastened to the center support structure. Finally, the modules of the invention can be used in situations where prior art ladder modules could not be used by providing steps that may be rotated in either direction on the support member to avoid any limbs or branches that may obstruct the rotation of the step in one direction.

The improved ladder module of the present invention comprises a securing arrangement attached to the center support member used to secure the module to the tree. The arrangement includes a belt fastener disposed on the support member between the upper step and the middle step. In one embodiment, the fastener is comprised of a stem extending outwardly from the support member and a radially extending flange attached to the stem opposite the support member that covers the stem. The flange provides an attachment point for a belt forming the remaining portion of the improved securing arrangement utilized with the ladder module. The belt is comprised of a pair of straps, each including a loop at one end. The loops on each strap are placed over the flange of the fastener to secure the loops to the fastener on the support member. One of the straps includes an adjustable buckle attached to the strap opposite the loop that engages the non-loop end of the remaining strap to releasably secure the belt about the trunk of the tree. The loop and fastener arrangement of the present invention allows the securing belt to be secured about the tree trunk with the buckle positioned on either side of the support member, so that the buckle may be selectively positioned to avoid any limbs, branches or other obstructions that may prevent the securing belt from performing properly. This securing arrangement is also able to be used on other devices utilized by hunters that are secured to a tree, such as tree stands.

Figure 7:
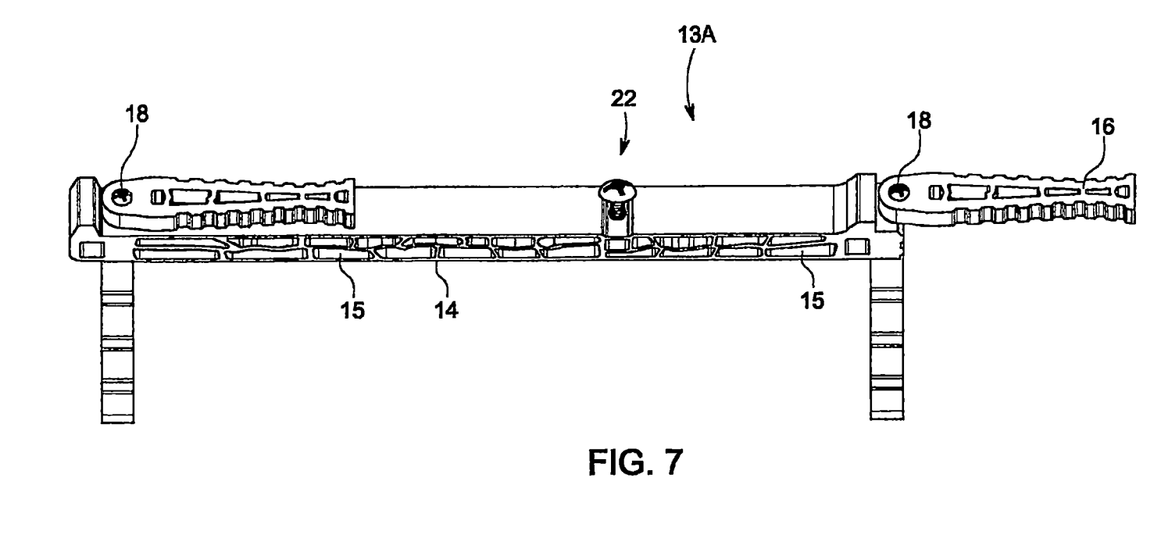
FIG. 7 is a top view illustrating the module ladder of the present invention.
Figure 8:
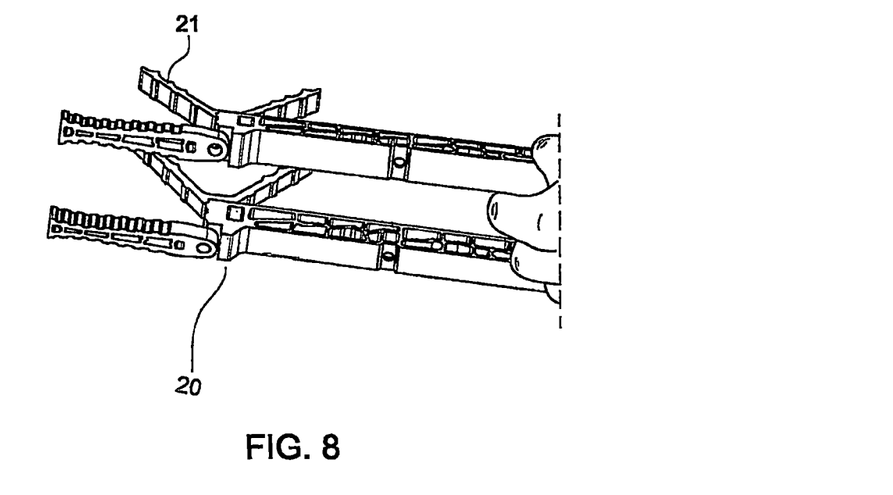
FIG. 8 and FIG. 9 illustrate how the sticks of the invention nest closely one to the other.
Figure 9:
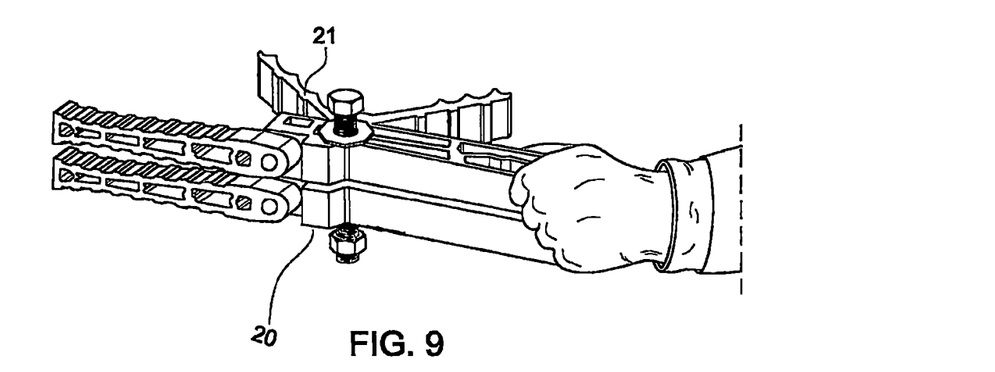
Figure 10:
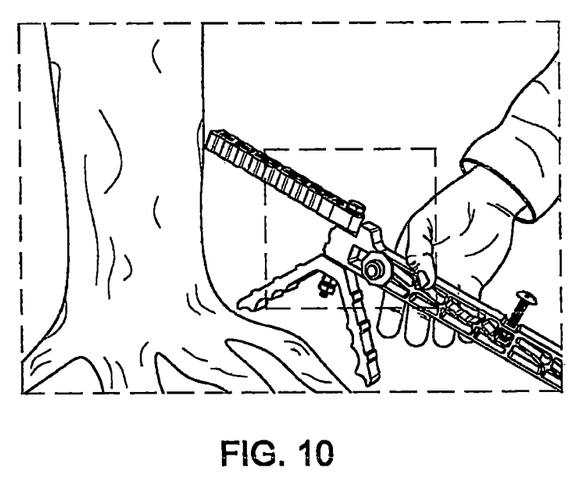
FIG. 10 illustrates the plug style grommets of the ladder module.
Figure 11:
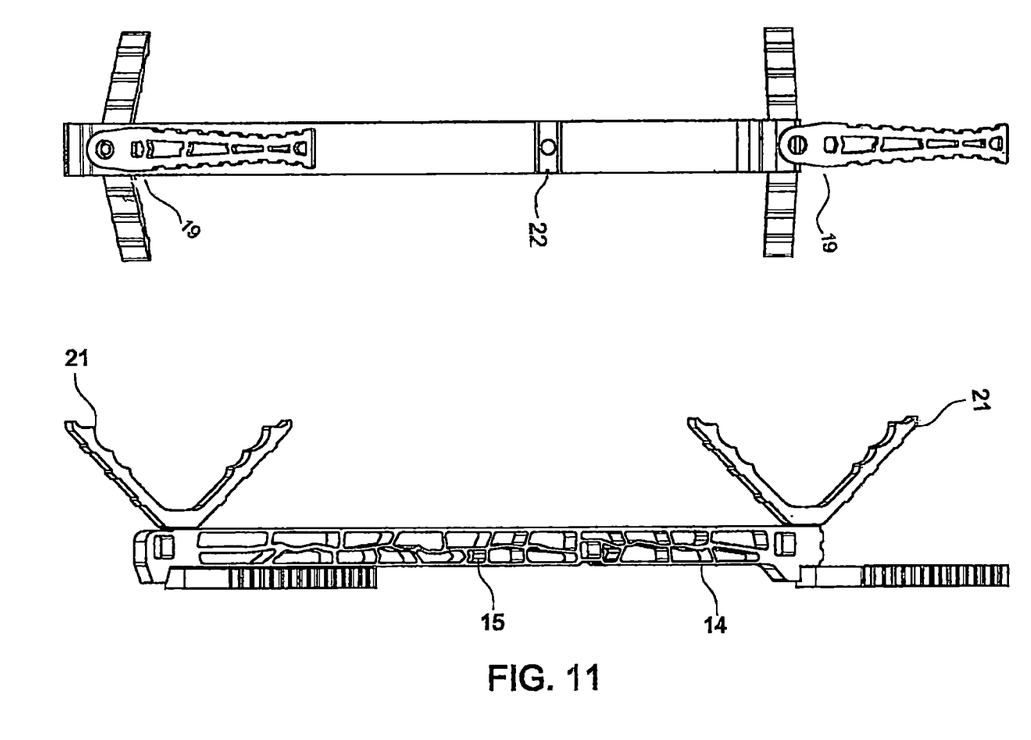
FIG. 11 shows a top view and a side view of the ladder modules of the invention.

FIGS. 7-11 illustrate a ladder module 13A constructed according to the present invention. Referring to FIG. 7, the module 13A includes a solid elongate support structure or member 14 that functions as the body of module 13A. The support member 14 optionally comprises hand grips cut right into the support member allowing for better grip when climbing. In one embodiment, the support member is not straight, it jogs for added concealment and profile break up when in tree. Patterns and true edges are very unnatural in nature. The cutout designs 15 cut out of support member of the sticks of the invention have no consecutive pattern to better blend in the wilderness. The cutout pattern 15 is best shown in FIG. 11.

Support member 14 also includes a number of steps 16 formed of a lightweight metal, preferably aluminum, that are spaced along one side of the support member 14. Each step 16 is rotatably mounted to the support member 14 to provide a stepping surface for an individual using the ladder module 13A. In one embodiment, the steps 16 are mounted to the support member 14 near the top end, bottom end, and at the center of the support member 14. As best shown in FIG. 7 the steps 16 are generally triangular in shape having a pair of stepping portions connected to each other at one end, forming a pointed end, and to opposite ends of a connecting portion opposite the pointed end. This configuration allows each step 16 to provide a stepping surface on each stepping portion when the step 16 is rotated to one side of the support member 14. To aid an individual using the steps 16 on support member 14 to climb the tree, each stepping portion includes a number of grooves spaced along its length. The grooves provide traction for the foot of the individual utilizing the step 16 to help prevent the foot from slipping off the stepping portion of the step 16.

Each step 16 is rotatably connected to the support member 14 by a bolt 18 inserted through an opening in the center of the support member. The bolt 18 extends through an aligned opening passing through support member 14 and is secured therein by a nut threadably mounted onto the bolt 18 on the side of support member 14 opposite the step 16. To facilitate the movement of each step 16 with respect to the support member 14, a washer formed of a low friction material is preferably disposed between the step 16 and support member 14 around bolt 18.

Each step 16 also includes a pair of curved shoulders 19 disposed in opposite ends of connecting portion, as best shown in FIG. 11. When the step 16 is rotated in either direction on support member 14, one of the annular shoulders 19 contacts a stop 20 positioned directly beneath the step 16 on support member 14. Each annular shoulder 19 engages the stop 20 to laterally position the step 16 such that each stepping portion provides a horizontal stepping surface on one side of the support member 14, depending upon the side of support member 14 to which the step 16 has been rotated. The stop 20 is fabricated directly in the solid center support member.

Referring now to FIG. 11, the support member 14 also includes a pair of support brackets 21 mounted adjacent the top end and bottom end of the support member 14. The brackets 21 are generally V-shaped, including an interior surface and an exterior surface. As illustrated by FIG. 11, the brackets 21 are rotatably mounted to each end of the support member to allow each bracket 21 to independently conform to the direction in which the tree trunk extends. The brackets 21 that grip the tree when climbing pivot allowing them to become flush with the body of the stick to minimize profile and to allow the sticks to nest closely together so that they can be easily carried/secured to the treestand of the invention. In one embodiment the brackets pivot 180°, and in another embodiment, they pivot 360° to allow said brackets to rest flush with the body or center support structure of the sticks.

The brackets 21 also include a number of teeth spaced along the length of each side of bracket 42 that are generally triangular in shape having a point extending outwardly from the interior surface of bracket 21. The teeth on bracket 21 engage the trunk of the tree to prevent the module 13A from sliding down the tree when a person is climbing a tree utilizing the module 13A.

Referring now to FIG. 11, the support member 14 also has a securing arrangement to hold the module 13A on tree. A fastener 22 is secured to the support member 14 between the steps 16. The fastener 22 includes a cylindrical mounting sleeve extending outwardly from the support member 14 and a circular retaining flange positioned on the mounting sleeve opposite the support member 14. The flange is preferably a metal washer having a diameter significantly greater than the sleeve and including a hole in the center of the flange. The sleeve and flange are secured to the support member 14 by a bolt inserted into the support member 14 through the hole in flange and through sleeve. The bolt extends through the support member 14 and is secured to the support member 14 opposite the fastener by a nut. The fastener 22 provides a point on the support member 14 used to removably attach each end of a securing belt to the support member 14 in order to reliably secure the module 13A to the tree.

The belt is comprised of a securing strap, a buckle strap, and a releasable buckle. The securing strap is an elongate strap of a durable material, such as nylon, that includes a free end and a loop integrally formed in the strap opposite the free end. The securing strap is removably attached to the fastener 22 by placing the loop around the retaining flange of fastener. The flange prevents the loop from disengaging from the fastener 22, maintaining the securing strap in attachment, with the support member 14.

The buckle strap is formed of the same material as the securing strap and also includes a loop at one end that is also removably attached to the fastener 22. However, the end of buckle strap opposite the loop is attached to the buckle, which is placed around the tree to receive the free end of securing strap to secure the ladder module 13A on the tree.

To attach the module 13A to a selected tree, first, the securing strap and buckle strap are secured to the fastener 22 on support member 14 so that the securing arrangement and, namely, the buckle on buckle strap, will not be obstructed by any limbs extending from the tree. Next, the brackets 21 are positioned against the center of the tree to position the support member 14 in a generally vertical direction on the tree. The brackets 21 may be rotated with respect to the support member 14 to conform to the shape of the tree. Then, the straps and of the securing belt are wrapped around the tree in opposite directions, and the free end of securing strap is inserted through the buckle. The securing strap is pulled tight through buckle to securely fasten the securing belt about the tree. Finally, each step 16 is rotated with respect to support member 14 to extend one of the stepping portions on step 16 to provide a horizontal stepping surface where desired on one side of the support member 14.

The invention also contemplates a lightweight, portable treestand with climbing sticks attached thereto via carrying ports, wherein said treestand comprises a seat member that interlocks to said platform forming a shelf like structure and wherein said climbing sticks comprise stabilizing brackets that pivot allowing them to rest flush with the body or center support structure of said climbing stick.

Various modes of carrying out the present invention are contemplated as being within the scope of the following claims particularly pointing out and distinctly claiming the subject matter which is regarded as the invention.

I claim:

1. A portable hang on treestand comprising a seat member, a platform member, and a center support structure connecting said seat member to said platform member, wherein said seat member comprises one or more male protrusions and said platform member comprises one or more attachment ports configured to receive said one or more male protrusions wherein when said treestand is folded up for transport, the one or more male protrusions of the seat member interlock with the one or more attachment ports of said platform locking the seat member in a rigid shelf structure that is substantially perpendicular to said platform.

2. The treestand of claim 1 wherein said platform is of uniform, one-piece rigid construction having an open grate-like configuration.

3. The treestand of claim 2 wherein said one-piece platform is fabricated from solid aluminum and/or aluminum alloy stock by a machining, milling, laser cutting or waterjet process.

4. The treestand of claim 2 wherein said platform is a cast aluminum platform.

5. The treestand of claim 1 wherein said center support structure is of hollow tubular design or is solid and is fabricated from solid aluminum stock by machining, milling, laser cutting or a waterjet process.

6. The treestand of claim 1 wherein said platform member additionally comprises receiving ports to allow for the convenient attachment of climbing sticks thereto.

* * * * *